US010624157B2

(12) United States Patent
Suzuki et al.

(10) Patent No.: US 10,624,157 B2
(45) Date of Patent: Apr. 14, 2020

(54) NETWORK SYSTEM, NETWORK MANAGEMENT METHOD AND NETWORK MANAGEMENT APPARATUS

(71) Applicant: HITACHI, LTD., Tokyo (JP)

(72) Inventors: Toshiaki Suzuki, Tokyo (JP); Taro Ogawa, Tokyo (JP); Jun Nakajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 15/880,047

(22) Filed: Jan. 25, 2018

(65) Prior Publication Data

US 2018/0213600 A1 Jul. 26, 2018

(30) Foreign Application Priority Data

Jan. 26, 2017 (JP) .................................. 2017-011881

(51) Int. Cl.
| | | |
|---|---|---|
| *H04W 88/18* | (2009.01) | |
| *H04W 28/10* | (2009.01) | |
| *H04W 40/20* | (2009.01) | |
| *H04W 72/12* | (2009.01) | |
| *H04W 24/02* | (2009.01) | |
| *H04W 40/36* | (2009.01) | |

(Continued)

(52) U.S. Cl.
CPC ......... *H04W 88/18* (2013.01); *H04L 41/0836* (2013.01); *H04L 43/0811* (2013.01); *H04W 24/02* (2013.01); *H04W 28/021* (2013.01); *H04W 28/10* (2013.01); *H04W 36/14* (2013.01); *H04W 40/20* (2013.01); *H04W 40/36* (2013.01); *H04W 72/121* (2013.01); *H04W 40/026* (2013.01); *H04W 84/12* (2013.01); *H04W 88/08* (2013.01)

(58) Field of Classification Search
CPC ..... H04L 29/06; H04L 29/0872; H04L 63/02; H04L 63/1408; H04L 63/1416; H04L 67/1051; H04L 67/2842; H04L 41/0836; H04L 43/0811; H04W 12/02; H04W 36/18; H04W 24/02; H04W 28/10; H04W 40/20; H04W 88/18
USPC ................................. 370/235, 242, 252, 328
See application file for complete search history.

(56) References Cited

U.S. PATENT DOCUMENTS 9,100,236 B1 * 8/2015 Shetty ..................... H04L 29/06
2006/0272025 A1 * 11/2006 Mononen ............ H04L 63/1416
726/26

(Continued)

FOREIGN PATENT DOCUMENTS

WO 2005/076548 A1 8/2005

*Primary Examiner* — Harun Chowdhury
(74) *Attorney, Agent, or Firm* — Volpe and Koenig, P.C.

(57) ABSTRACT

The network system includes a plurality of communication nodes, a network that is connected to the plurality of communication nodes, and a network management server that is connected to the network. The network management server accepts information of a plurality of regions in each of which a plurality of areas that are assigned to the respective communication nodes are grouped, and the network management server executes setting of controlling an abnormal flow on the communication nodes to which the areas grouped in a first region in which the areas assigned to the communication node notifying detection of the mobile unit that transmits the abnormal flow are grouped and at least one second region adjacent to the first region are assigned.

4 Claims, 15 Drawing Sheets

(51) Int. Cl.
*H04W 36/14* (2009.01)
*H04W 28/02* (2009.01)
*H04L 12/24* (2006.01)
*H04L 12/26* (2006.01)
*H04W 84/12* (2009.01)
*H04W 88/08* (2009.01)
*H04W 40/02* (2009.01)

(56) References Cited

U.S. PATENT DOCUMENTS

| | | |
|---|---|---|
| 2007/0223420 A1 | 9/2007 | Hori et al. |
| 2014/0075538 A1* | 3/2014 | Im .............................. H04L 63/02 |
| | | 726/13 |
| 2017/0019495 A1* | 1/2017 | Bennis ................ H04L 67/2842 |
| 2018/0270719 A1* | 9/2018 | Chai ..................... H04W 36/18 |

\* cited by examiner

F I G. 5

| | 501 | 502 | 503 | 504 |
|---|---|---|---|---|
| | REGION ID | BASE STATION ID | COM NODE ID | ADJACENT REGION ID |
| 511 | R1(REGION 1) | B1(BASE STATION 1) | N1(NODE 1) | R2 |
| | | B2(BASE STATION 2) | N2(NODE 2) | |
| 512 | R2(REGION 2) | B3(BASE STATION 3) | N3(NODE 3) | R1、R3 |
| | | B4(BASE STATION 4) | N4(NODE 4) | |
| 513 | R3(REGION 3) | B5(BASE STATION 5) | N5(NODE 5) | R2 |
| | | B6(BASE STATION 6) | N6(NODE 6) | |
| | - | - | - | - |

F I G. 6

INTERRUPTION

| | 601 | 602 | 603 | 604 | 605 | 606 | 607 | 608 | |
|---|---|---|---|---|---|---|---|---|---|
| | INTERRUPTION FLOW ID | SRC IP ADDRESS | DEST IP ADDRESS | CONNECTION STATE | BASE STATION ID | COM NODE ID | AFFILIATED REGION ID | INTERRUPTION SETTING COM NODE ID | |
| | F1 | s1 | d1 | C | B3 | N3 | R2 | N1, N2, N3, N4, N5, N6 | 611 |
| | | | | H2 | B2 | N2 | R1 | N1, N2, N3, N4 | 612 |
| | | | | H1 | B1 | N1 | R1 | N1, N2, N3, N4 | 613 |

F I G. 7
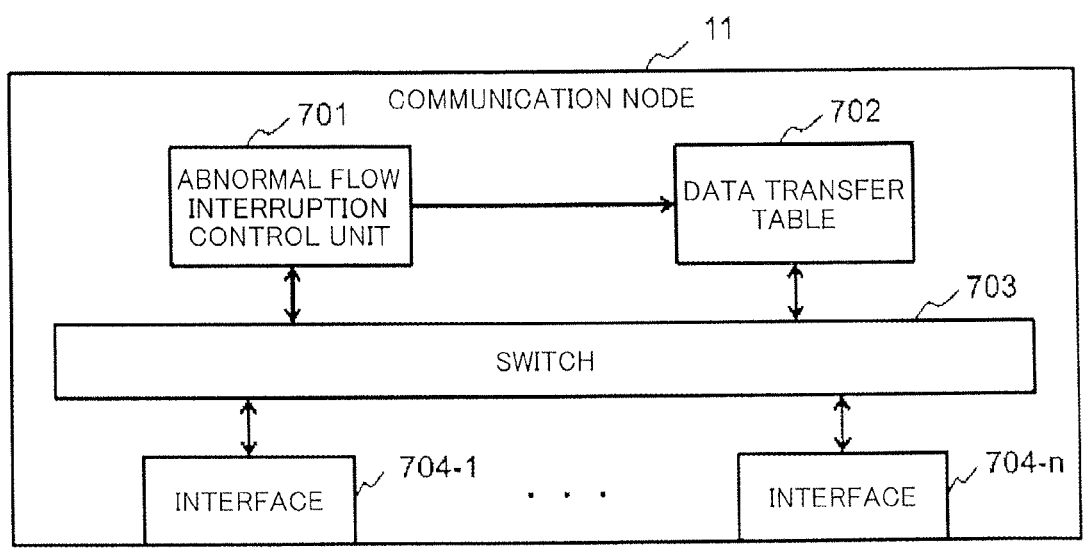

FIG. 10

| REGION ID | LATITUDE RANGE | | LONGITUDE RANGE | |
|---|---|---|---|---|
| | LATITUDE 1 | LATITUDE 2 | LONGITUDE 1 | LONGITUDE 2 |
| R1(REGION 1) | n1 | n2 | e1 | e2 |
| R2(REGION 2) | n1 | n2 | e2 | e3 |
| R3(REGION 3) | n1 | n2 | e3 | e4 |
| – | – | – | – | – |

FIG. 11

| BASE STATION ID | LATITUDE | LONGITUDE | COM NODE ID |
|---|---|---|---|
| B1(BASE STATION 1) | m1 | f1 | N1(NODE 1) |
| B2(BASE STATION 2) | m1 | f2 | N2(NODE 2) |
| B3(BASE STATION 3) | m1 | f3 | N3(NODE 3) |
| B4(BASE STATION 4) | m1 | f4 | N4(NODE 4) |
| B5(BASE STATION 5) | m1 | f5 | N5(NODE 5) |
| B6(BASE STATION 6) | m1 | f6 | N6(NODE 6) |
| B7(BASE STATION 7) | m1 | f7 | N7(NODE 7) |
| – | – | – | – |

F I G. 1 2

| REGION ID | BASE STATION ID | COM NODE ID | ADJACENT REGION ID |
|---|---|---|---|
| R1(REGION 1) | B1(BASE STATION 1) | N1(NODE 1) | R2 |
| | B2(BASE STATION 2) | N2(NODE 2) | |
| R2(REGION 2) | B3(BASE STATION 3) | N3(NODE 3) | R1、R3 |
| | B4(BASE STATION 4) | N4(NODE 4) | |
| | B5(BASE STATION 5) | N5(NODE 5) | |
| R3(REGION 3) | B6(BASE STATION 6) | N6(NODE 6) | R2 |
| | B7(BASE STATION 7) | N7(NODE 7) | |
| - | - | - | - |

F I G. 1 3 A

| CONNECTION STATE | SRC IP ADDRESS | CONNECTED BASE STATION ID | CONNECTION START TIME | MOVING SPEED |
|---|---|---|---|---|
| C | s1 | B2 | 2016.4.1 13:04:00 | V1(48Km/h) |
| H | s1 | B1 | 2016.4.1 13:00:00 | - |

F I G. 1 3 B

| CONNECTION STATE | SRC IP ADDRESS | CONNECTED BASE STATION ID | CONNECTION START TIME | MOVING SPEED |
|---|---|---|---|---|
| C | s2 | B3 | 2016.10.1 16:02:00 | V2(96Km/h) |
| H | s2 | B2 | 2016.10.1 16:00:00 | - |

F I G. 1 4
| | 1401 | 1402 | 1403 |
|---|---|---|---|
| | REGION AREA MANAGEMENT NUMBER | SPEED RANGE | THE NUMBER OF REGIONS (THE NUMBER OF REGIONS /AREA R) |
| 1411 | 1 | LOWER THAN 80 Km/h | 16 |
| 1412 | 2 | HIGHER THAN 80 Km/h | 9 |
F I G. 1 5 A
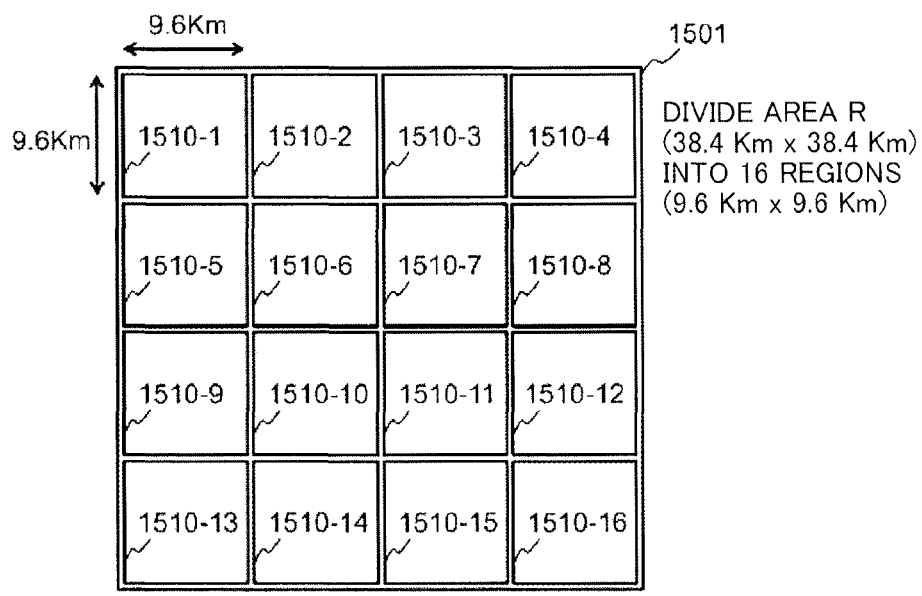

F I G. 1 5 B
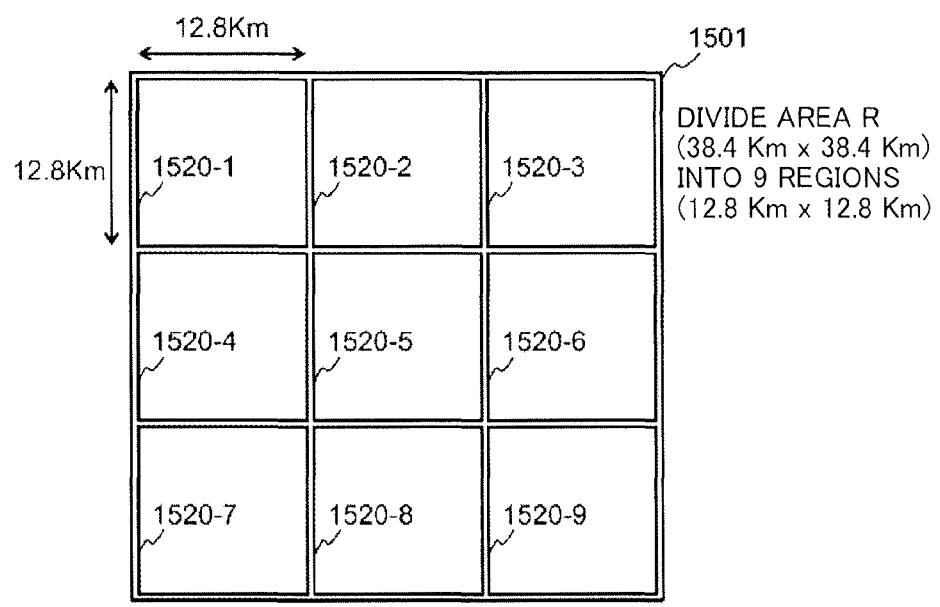

NETWORK SYSTEM, NETWORK MANAGEMENT METHOD AND NETWORK MANAGEMENT APPARATUS

CLAIM OF PRIORITY

The present application claims priority from Japanese application JP 2017-011881 filed on Jan. 26, 2017, the content of which is hereby incorporated by reference into this application.

BACKGROUND

The present invention relates to a network system, a network management method, and a network management apparatus.

An event in which a service on a network provided by an application server malfunctions by transmitting a large amount of data on a communication network has occurred and a service continuity against such an event has been desired.

As a background art in the present field, there is a technique disclosed in International Publication WO 2005/076548. The publication discloses a communication handover method, a communication message processing method, and a program for causing a computer to execute those methods, which are capable of allowing a mobile terminal performing a handover to rapidly and continuously receive an additional service that has been received before the handover even after the handover.

As a solution the publication discloses as follows: when the mobile terminal (MN 10) performs the handover, the MN selects, as a proxy, a node (QNE (proxy) 68) having an NSLP for a QoS existing in the vicinity of an AR (access router) 31 (in the vicinity of the AR on a network configuration) belonging to a destination subnet 30. The MN transmits, to the proxy, a message including a flow identifier and a session identifier related to a route 24 that has been established between the MN and a CN 60 before the handover. The proxy transmits the message including the flow identifier and the session identifier to the CN, and establishes a new route 34 and finds out a crossover node at which those two routes start to intersect with each other, on the basis of a response result to the message.

SUMMARY

However, in the technique disclosed in the above publication, there is a problem that it is not taken into consideration to prevent an unnecessary consumption of network resources when there is an abnormal data flow in the communication network. In particular, there arises a problem that there is a need to continue interruption of the abnormal data flow in the case where a mobile unit (mobility object) that transmits the abnormal data moves.

In addition, in executing the abnormal data flow interruption according to the movement of the mobile unit, the implementation of setting the data flow interruption for a large number of unrelated communication nodes consumes a large amount of network resources, resulting in a problem of inefficiency.

Therefore, the present invention has been made in view of the problems described above, and it is an object of the present invention to provide a system capable of interrupting an abnormal data flow with a reduction in consumption of network resources according to movement of a mobile unit that transmits the abnormal data flow in a communication network.

A typical network system according to the present invention includes a plurality of communication nodes; a network that is connected to the plurality of communication nodes; and a network management server that is connected to the network, in which the network management server accepts information of a plurality of regions in each of which a plurality of areas that are assigned to the respective communication nodes are grouped, and the network management server executes setting of controlling an abnormal flow on the communication nodes to which the areas grouped in a first region in which the areas assigned to the communication node notifying detection of the mobile unit that transmits the abnormal flow are grouped and at least one second region adjacent to the first region are assigned.

According to the disclosures, the abnormal data flow can be interrupted with a reduction in consumption of the network resources according to movement of a mobile unit that transmits the abnormal data flow in the communication network.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows an example of region management data;

FIG. 6 shows an example of interruption setting management data;

FIG. 7 shows a configuration example of a communication node;

FIG. 10 shows an example of region domain management data according to a second embodiment;

FIG. 11 shows an example of base station management data according to the second embodiment;

FIG. 12 shows an example of base station accommodation region management data according to the second embodiment;

FIG. 13A shows an example of mobile unit speed management data according to a third embodiment;

FIG. 13B shows an example of mobile unit speed management data according to the third embodiment;

FIG. 14 shows an example of region domain management data according to the third embodiment;

FIG. 15A shows an example of region segmentation management according to a mobile unit speed in the third embodiment;

FIG. 15B shows an example of the region segmentation management according to the mobile unit speed in the third embodiment;

DESCRIPTION OF THE EMBODIMENTS

Figure 1:
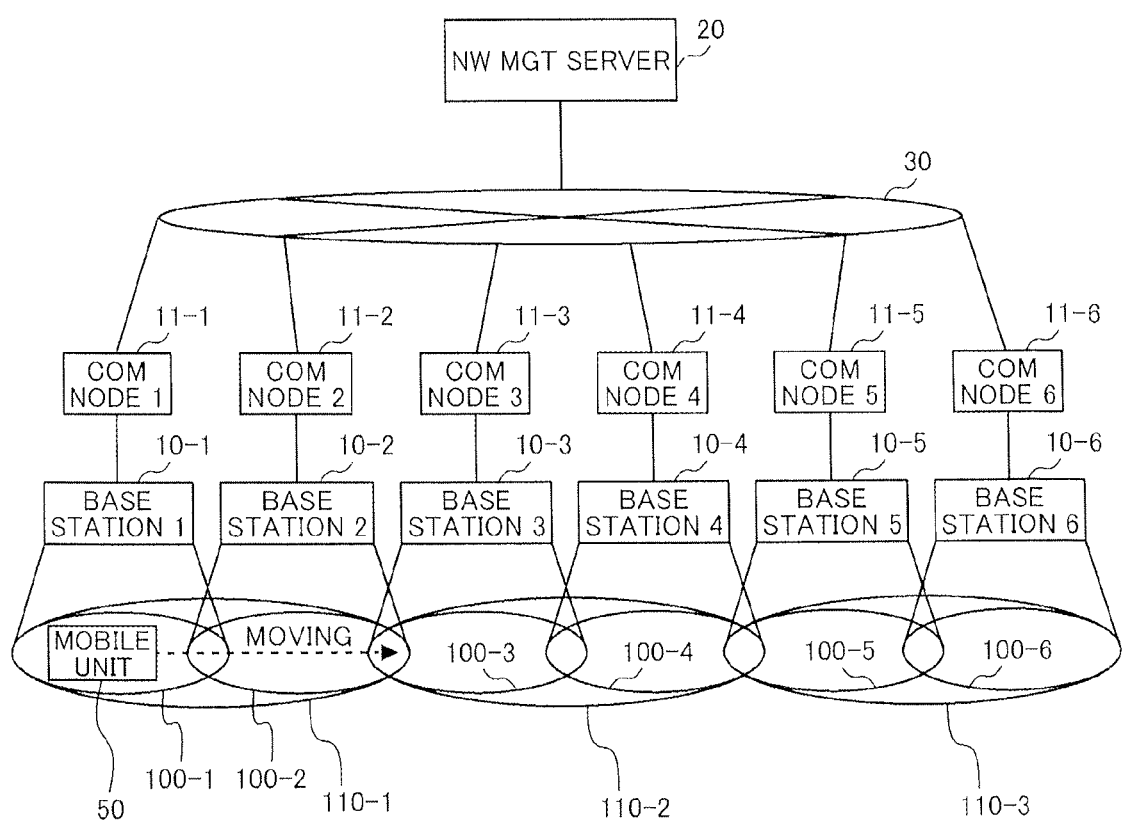
FIG. 1 shows a configuration example of a network system.

Embodiments of the present invention will be described in detail with reference to the drawings. However, the present invention is not construed as being limited to the description of the embodiments to be described below. Person skilled in the art can easily understand that specific configurations of the embodiments can be changed without departure from a spirit or a scope of the present invention.

In order to facilitate understanding of the invention, a position, size, shape, range, or the like of each component shown in the drawings or the like may not express an actual position, size, shape, range, or the like. For that reason, the embodiments are not necessarily limited to the position, size, shape, range, or the like described in drawings and the like.

The respective embodiments of the present invention will be described below with reference to FIGS. 1 to 19. In any of the following embodiments, when an abnormal data flow occurs from a mobile unit that communicates over a network, interruption of the abnormal data flow is executed with a reduction in consumption of network sources by following a movement of the mobile unit.

First Embodiment

In the present embodiment, a description will be given of an example in which a domain where a plurality of areas covered by respective base stations in a wireless network are grouped is managed as a region, and an interruption setting of an abnormal flow (data string) is controlled on a region basis. Hereinafter, the configuration and operation of a network system and components of the network according to a first embodiment will be described with reference to FIGS. 1 to 9.

FIG. 1 is a diagram showing an example of the configuration of the network system. As shown in FIG. 1, the network system includes a network management (nw mgt) server 20, a base station 1 (10-1) to a base station 6 (10-6), a communication (com) node 1 (11-1) to a communication node 6 (11-6), and a network (30) that connects the respective communication nodes 11. Note that reference numerals are written in parentheses and when any one of the communication node 1 (11-1) to the communication node 6 (11-6) is indicated without any identification, any communication node is indicated as the communication node (11) and other reference numerals are described in the same manner.

With the use of the network system, a mobile unit (50) communicates with any one of the base stations (10) by wireless connection. Each of the base stations (10) is connected to the communication node (11) for transmitting received data to another base station (10). For example, the base station 1 (10-1) is connected to the communication node 1 (11-1). Similarly, the base stations 2 (10-2) to the base stations 6 (10-6) are connected to the communication node 2 (11-2) to the communication node 6 (11-6), respectively.

The network management server (20) manages a range where wireless connection can be performed in each of the base stations (10) as an area (100). For example, the network management server (20) manages a range of 2 km in radius centered on the base station (10) as the area (100). In FIG. 1, a region in which the mobile unit (50) is wirelessly connectable to the base station 1 (10-1) is illustrated as an area (100-1). Likewise, ranges in which the mobile unit (50) are wirelessly connectable to the base station 2 (10-2) to the base station 6 (10-6) are illustrated as an area (100-2) to an area (100-6), respectively.

In addition, the network management server (20) configures regions (110) in each of which the plurality of areas (100) are grouped and manages the interruption of an abnormal flow. In FIG. 1, the network management server (20) manages a range in which the area 1 (100-1) and the area 2 (100-2) are grouped as a region 1 (110-1), manages a range in which the area 3 (100-3) and the area 4 (100-4) are grouped as a region 2 (110-2), and manages a range in which the area 5 (100-5) and the area 6 (100-6) are grouped as a region 3 (110-3).

When the mobile unit (50) connects to the base station 1 (10-1) and starts to transmit the abnormal flow, the network management server (20) executes setting of interrupting the abnormal flow from the mobile unit (50) on the communication node 1 (11-1) and the communication node 2 (11-2) which are connected to the base station 1 (10-1) and the base station 2 (10-2) in the region 1 (110-1) to which the mobile unit (50) belongs, respectively.

Further, the network management server (20) executes the setting of interrupting the abnormal flow from the mobile unit (50) on the communication node 3 (11-3) and the communication node 4 (11-4) which are connected to the base station 3 (10-3) and the base station 4 (10-4), respectively, in the region 2 (110-2) adjacent to the region 1 (110-1) to which the mobile unit (50) belongs.

Further, when the mobile unit (50) performs the wirelessly connection within the region 2 (110-2), the network management server (20) executes the setting of interrupting the abnormal flow from the mobile unit (50) on the communication node 5 (11-5) and the communication node 6 (11-6) connected to the base station 5 (10-5) and the base station 6 (10-6) in the region 3 (110-3), respectively.

In this way, the interruption management of the abnormal flow transmitted from the mobile unit (50) is performed by the region (110) in which the plurality of areas (100) are grouped. As a result, even in the case where a moving speed of the mobile unit (50) is high, when the mobile unit (50) moves and connects to the adjacent base station (10), the abnormal flow interruption control can be executed without any delay.

Although FIG. 1 shows an example in which the base station (10) and the communication node (11) are connected to each other, but the plurality of base stations (10) may be connected to one communication node (11). The communication node (11) may be a device of a unit of interrupting a communication, and the area (100) may be a range of a unit where the communication is interrupted. The unit of the interruption may be a unit for interrupting the communication by one setting or a group of settings.

FIG. 1 shows an example of an ellipse (circle) range in which one region (110) includes two areas (100), but one region (110) may include three or more areas (100) or may be a range of a shape obtained by combining two or more areas (100) together. There is no restriction on what kind of flow the abnormal flow transmitted by the mobile unit (50) is, but the abnormal flow may be identified by the identification of the mobile unit (50). The mobile unit (50) may move to the region 1 (110-1) in a state of transmitting the abnormal flow.

The two adjacent regions (110) mean that parts of the areas (100) included in the respective regions (110) overlap with each other. For example, as with the region 1 (110-1) and the region 2 (110-2) shown in FIG. 1, parts of the area (100-2) and the area (100-3) overlap with each other. The configuration in which the parts of the areas (100) overlap with each other may be replaced with a configuration in which the areas (100) come in contact with each other.

In the two adjacent regions (110), parts of the areas (100) may not overlap with each other, and the areas (100) may come out of contact with each other. When the mobile unit (50) shown in FIG. 1 moves from the region 1 (110-1) to the region 3 (110-3), if the mobile unit (50) passes through the region 2 (110-2), the region 1 (110-1) and the region 3 (110-3) may not be adjacent to each other. On the other hand, if there is a route in which the mobile unit (50) moves from the region 1 (110-1) to the region 3 (110-3) through no region 2 (110-2), the region 1 (110-1) and the region 3 (110-3) may be included in the two adjacent regions (110).

Figure 2A:
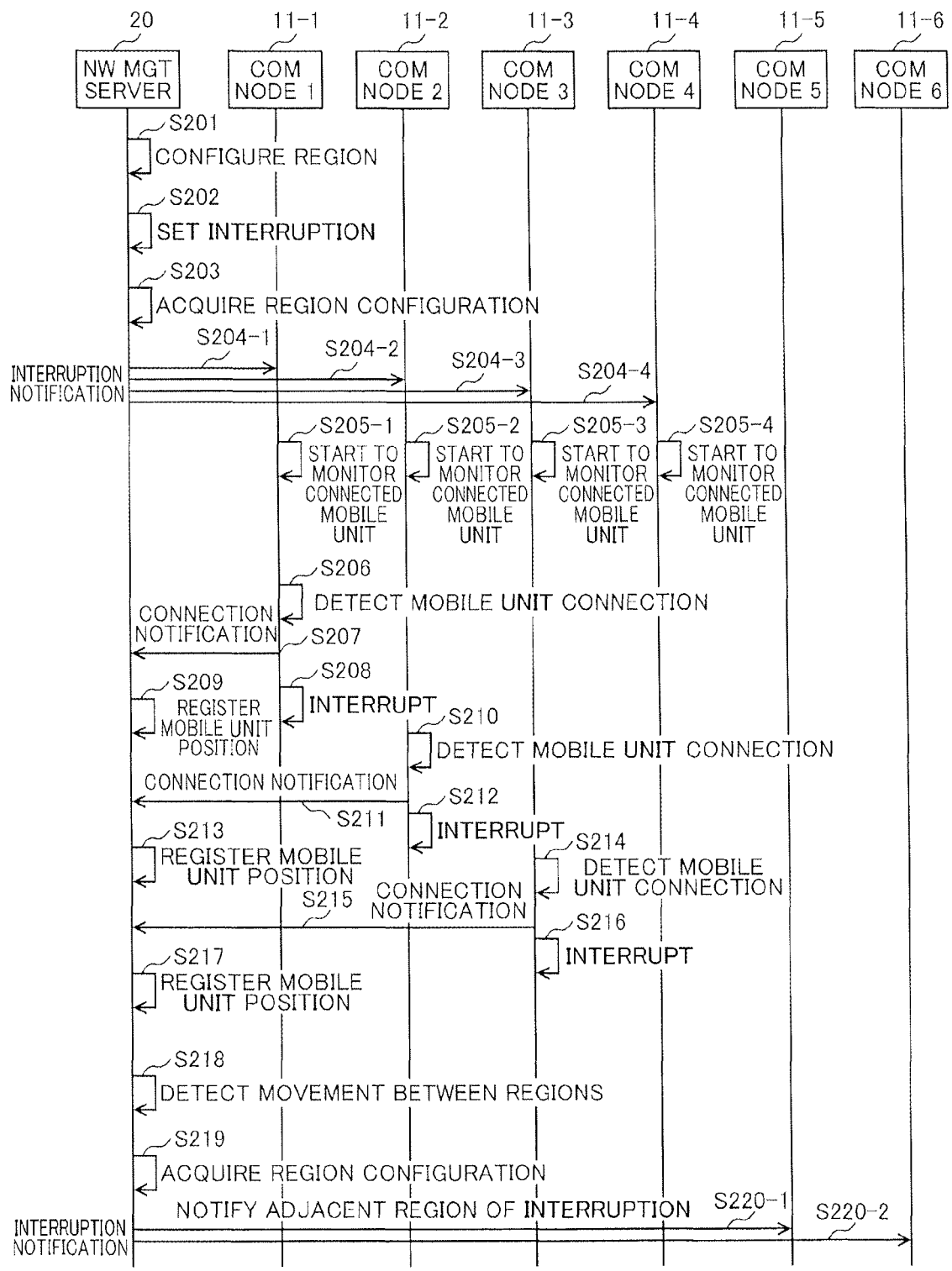
FIG. 2A shows an example of an abnormal flow interruption processing sequence.
Figure 2B:
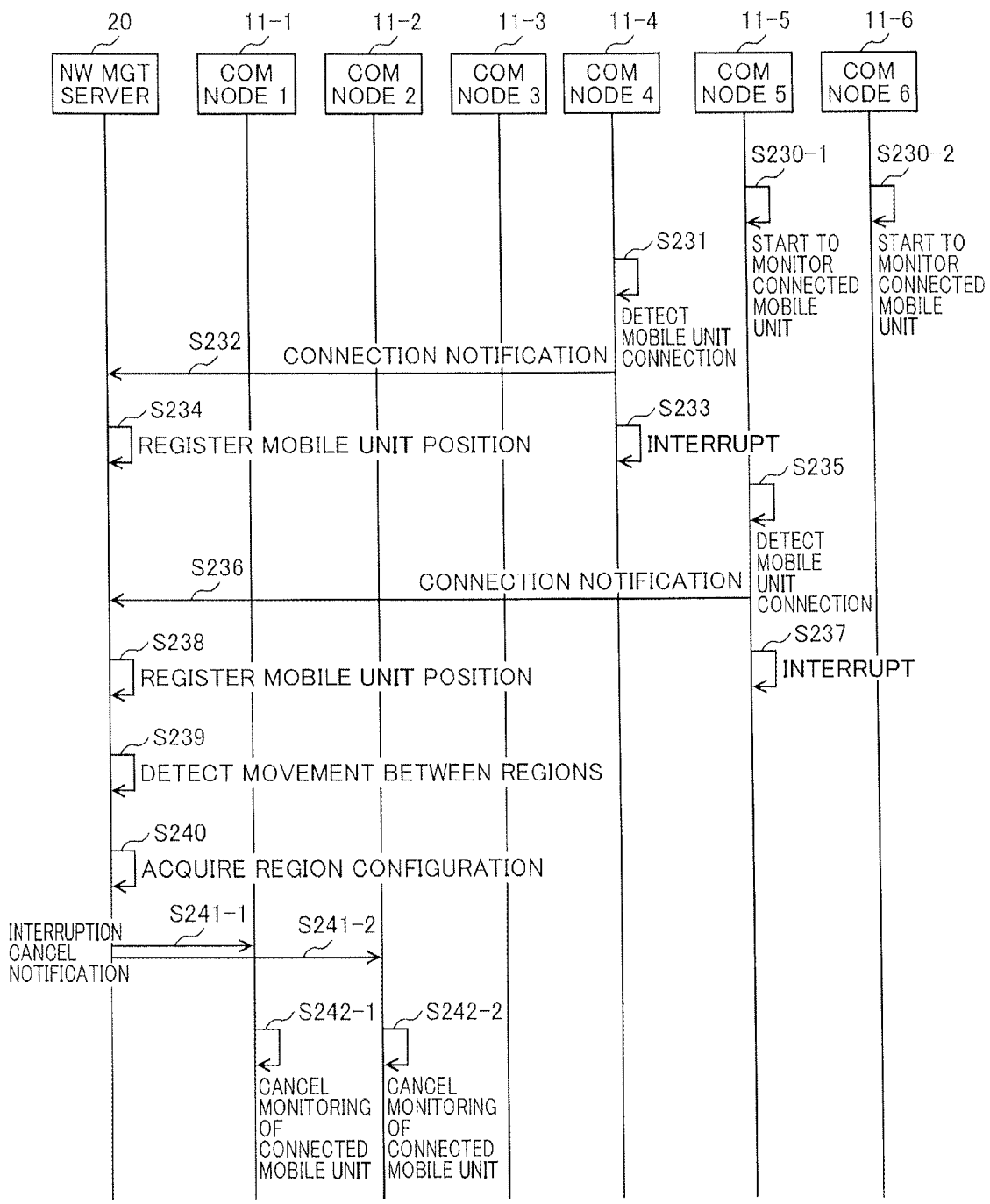
FIG. 2B shows an example of the abnormal flow interruption processing sequence.

FIG. 2A is a diagram showing an example of an abnormal flow interruption processing sequence when the mobile unit (50) moves from the region 1 (110-1) to the region 2 (110-2). FIG. 2B is a diagram showing an example of an abnormal flow interruption processing sequence when the mobile unit (50) moves from the region 2 (110-2) to the region 3 (110-3).

As shown in FIG. 2A, the network management server 20 configures the region (110) in which the plurality of areas 100 are grouped (Step (S201)). A relationship between the areas (100) and the regions (110) is based on an input from an administrator of the network system, but the relationship may be written in a setting file and read from the file.

The network management server (20) performs setting of an abnormal flow to be interrupted (Step (S202)). More specifically, the network management server (20) registers the base station (10) and the communication node (11) which have received the abnormal flow, and an identifier for identifying the abnormal flow.

As the identifier of the abnormal flow, the network management server (20) registers, for example, any one of a source IP address, a destination IP address, a source port number, and a destination port number of the mobile unit (50) that transmits the abnormal flow, or a protocol number of data transmission, or a combination of those elements. Alternatively, the network management server (20) may use an identifier other than those identifiers. The identifier for identifying the abnormal flow is based on an input from the administrator of the network system, but the identifier may be written in the setting file and read from the file.

The network management server (20) acquires the configuration of the regions, identifies the communication node (11) at which the abnormal flow interruption is to be set (Step (S203)), and executes the setting of the abnormal flow interruption (interruption notification) on the identified communication node (11) (Steps (S204-1 to S204-4)). The interruption setting is executed for each of the plurality of communication nodes (11) included in the region (110).

With the region (110) as a cornerstone, the network management server (20) executes the interruption setting on the communication nodes (11) included in the region (110), thereby being capable of reducing the amount of memory consumed by the communication node (11) as the network system as compared with a case in which the interruption setting is simply executed on a large number of communication nodes (11) included in the network system.

The communication node 1 (11-1) to the communication node 4 (11-4) starts to monitor whether the abnormal flow has been received from the mobile unit (50) transmitting the abnormal flow according to a set abnormal flow interruption, or not (whether to be connected to the mobile unit (50), or not) (Steps (S205-1 to S205-4)).

When the mobile unit (50) transmitting the abnormal flow wirelessly connects to the communication node 1 (11-1) through the base station 1 (10-1) and transmits the abnormal flow, the communication node 1 (11-1) detects the detection of the abnormal flow from the mobile unit (50) (the connection to the mobile unit (50) (Step (S206)).

Upon detecting the connection of the mobile unit (50) transmitting the abnormal flow, the communication node 1 (11-1) notifies the network management server (20) of information indicating the connection of the mobile unit (50) transmitting the abnormal flow (Step (S207)). Upon notifying the network management server (20) of the information indicating the connection of the mobile unit (50) transmitting the abnormal flow, the communication node 1 (11-1) executes the interruption of the received abnormal flow (Step (S208)).

The network management server (20) registers the base station 1 (10-1) and the communication node 1 (11-1) connected to each other (as the position of the mobile unit (50)) according to the connection information on the notified mobile unit (50) (Step (S209)).

Thereafter, when the mobile unit (50) moves and establishes the wireless connection through the base station 2 (10-2), the communication node 2 (11-2) detects the reception of the abnormal flow (the connection of the mobile unit (50)) from the mobile unit (50) transmitting the abnormal flow (Step (S210)).

Upon detecting the connection of the mobile unit (50) transmitting the abnormal flow, the communication node 2 (11-2) notifies the network management server (20) of the information indicating the connection of the mobile unit (50) transmitting the abnormal flow (Step (S211)). Upon notifying the network management server (20) of the information indicating the connection of the mobile unit (50) transmitting the abnormal flow, the communication node 2 (11-2) executes the interruption of the received abnormal flow (Step (S212)).

The network management server (20) registers the base station 2 (10-2) and the communication node 2 (11-2) connected to each other (as the position of the mobile unit (50)) according to the connection information on the notified mobile unit (50) (Step (S213)).

Thereafter, when the mobile unit (50) moves and establishes the wireless connection through the base station 3 (10-3), the communication node 3 (11-3) detects the reception of the abnormal flow (the connection of the mobile unit (50)) from the mobile unit (50) transmitting the abnormal flow (Step (S214)).

Upon detecting the connection of the mobile unit (50) transmitting the abnormal flow, the communication node 3 (11-3) notifies the network management server (20) of the information indicating the connection of the mobile unit (50) transmitting the abnormal flow (Step (S215)). Upon notifying the network management server (20) of the information indicating the connection of the mobile unit (50) transmitting the abnormal flow, the communication node 3 (11-3) executes the interruption of the received abnormal flow (Step (S216)).

The network management server (20) registers the base station 3 (10-3) and the communication node 3 (11-3) connected to each other (as the position of the mobile unit (50)) according to the connection information on the notified mobile unit (50) (Step (S217)), and detects the movement of the mobile unit (50) between the regions (110) according to notified connection information on the mobile unit (50) (Step (S218)).

Upon detecting that the mobile unit (50) has moved between the regions (110), the network management server (20) acquires the configuration of the regions (110), identifies the communication nodes (11) connected to the base stations (10) in the region (110) adjacent to the moved region (110) (Step (S219)), and executes the setting (interruption notification) of the abnormal flow interruption on the identified communication node 5 (11-5) and communication node 6 (11-6) (Step (S220-1 to S220-2)).

As shown in FIG. 2B, the communication node 5 (11-5) to the communication node 6 (11-6) deal with the set abnormal flow interruption, and starts to monitor whether to receive the abnormal flow from the mobile unit (50) transmitting the abnormal flow, or not (whether to connect to the mobile unit (50), or not) (Steps (S230-1 to S230-2)).

Thereafter, when the mobile unit (50) moves and establishes a wireless connection through the base station 4 (10-4), the communication node 4 (11-4) detects the reception of the abnormal flow (the connection of the mobile unit (50)) from the mobile unit (50) transmitting the abnormal flow (Step (S231)).

Upon detecting the connection of the mobile unit (50) transmitting the abnormal flow, the communication node 4 (11-4) notifies the network management server (20) of information indicating the connection of the mobile (50) transmitting the abnormal flow (Step (S232)). Upon notifying the network management server (20) of the information indicating the connection of the mobile unit (50) transmitting the abnormal flow, the communication node 4 (11-4) executes the interruption of the received abnormal flow (Step (S233)).

The network management server (20) registers the base station 4 (10-4) and the communication node 4 (11-4) connected to each other according to the connection information on the notified mobile unit (50) (as a position of the mobile unit (50) (Step (S234)).

Thereafter, when the mobile unit (50) moves and establishes a wireless connection through the base station 5 (10-5), the communication node 5 (11-5) detects the reception of the abnormal flow from the mobile unit (50) transmitting the abnormal flow (connection of mobile unit (50)) (Step (S235)).

Upon detecting the connection of the mobile unit (50) transmitting the abnormal flow, the communication node 5 (11-5) notifies the network management server (20) of the information indicating the connection of the mobile unit (50) transmitting the abnormal flow (Step (S236)). Upon notifying the network management server (20) of the information indicating the connection of the mobile unit (50) transmitting the abnormal flow, the communication node 5 (11-5) executes the interruption of the received abnormal flow (Step (S237)).

The network management server (20) registers the base station 5 (10-5) and the communication node 5 (11-5) connected to each other (as the position of the mobile unit (50)) according to the connection information on the notified mobile unit (50) (Step (S238)), and detects the movement of the mobile unit (50) between the regions (110) according to notified connection information on the mobile unit (50) (Step (S239)).

Upon detecting that the mobile unit (50) has moved between the regions (110), the network management server (20) acquires the configuration of the regions (110), and identifies the communication nodes (11) connected to the base stations (10) in the region (110) adjacent to the moved region (110) (Step (S240)).

In this example, since the mobile unit (50) has moved from the region 2 (110-2) to the region 3 (110-3), the network management server (20) identifies the communication node 1 (11-1) to the communication node 2 (11-2) to be connected to the base station 1 (10-1) to the base station 2 (10-2) in the region 1 (110-1), respectively, for executing cancellation of the abnormal flow interruption setting.

The network management server (20) executes the cancellation of the abnormal flow interruption setting on the specified communication node 1 (11-1) to communication node 2 (11-2) (Steps (S241-1 to S241-2)).

With the region (110) connected with the mobile unit transmitting the abnormal flow as a cornerstone, the network management server (20) cancels the interruption setting of the abnormal flow (interruption cancellation notification) for the communication nodes (11) in the non-adjacent regions (110), thereby being capable of reducing the amount of memory consumed by the communication node (11) in the network system.

The communication node 1 (11-1) to the communication node 2 (11-2) deal with the abnormal flow interruption cancellation and terminates monitoring of whether the abnormal flow has been received from the mobile unit (50) transmitting the abnormal flow, or not (Steps (S242-1 to S242-2)).

Figure 3:
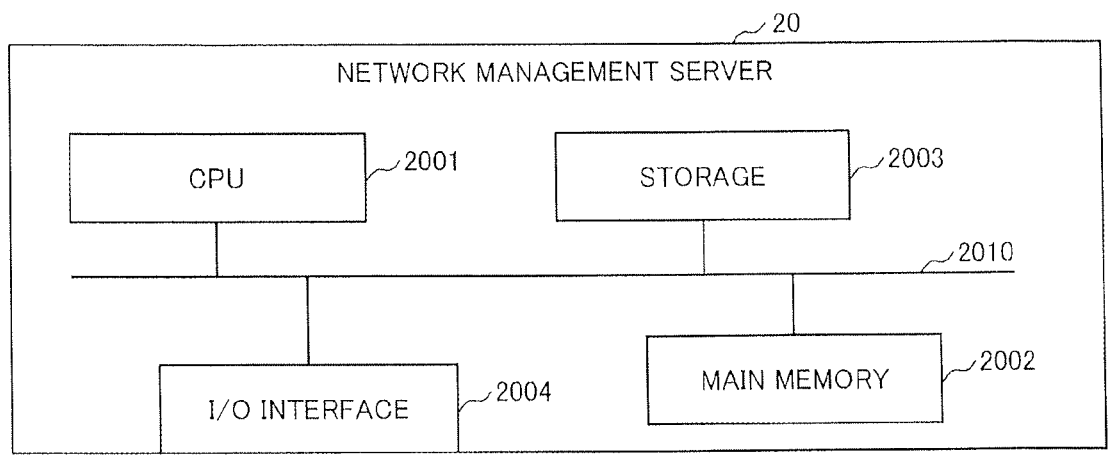
FIG. 3 shows a configuration example of a network management server.

FIG. 3 is a diagram showing a configuration example of the network management server (20). As shown in FIG. 3, the network management server (20) includes a CPU (2001) that is a processor (processing unit), a main memory (2002) and a storage (2003) which are storage devices, and an I/O interface (2004) that transmits and receives data over the network (30), and those configurations are connected to each other through a bus (2010). The network management server (20) may further include an I/O device not shown, for example, a keyboard or an image display device.

The CPU (2001) controls the respective configurations of the network management server (20), loads a program stored in the storage (2003) to the main memory (2002), and executes the program, to thereby form various functional units of the network management server (20), and realize various functions.

The main memory (2002) is a DRAM (dynamic random access memory) or the like, and stores an abnormal flow interruption management program to be executed by the CPU (2001) and work data (region management data and interruption setting management data) (2003) necessary for the program execution. The storage (2003) is a large-capacity storage device such as an SSD (solid state drive) or an HDD (hard disk drive). In particular, in this example, an abnormal flow interruption management program is stored in the storage (2003).

Figure 4:
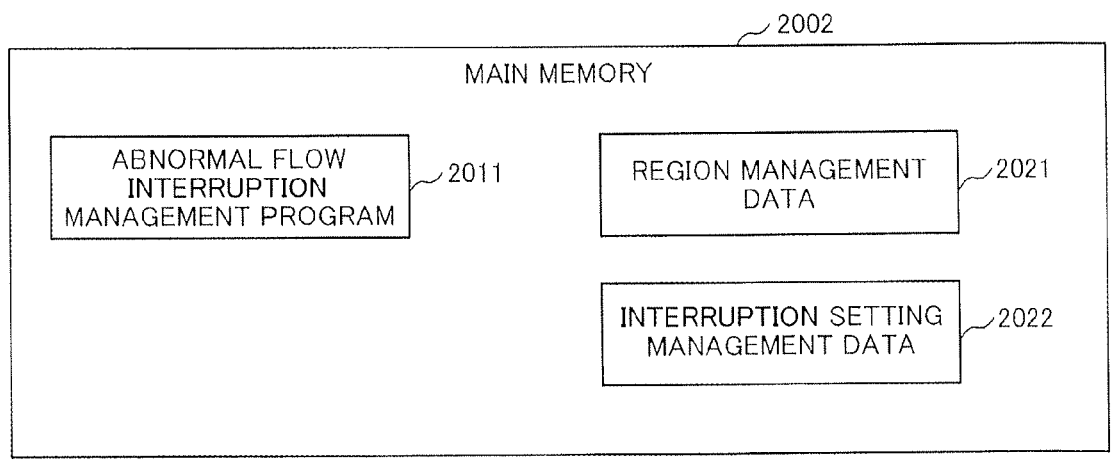
FIG. 4 shows an example of data held in a memory in a network management server.

FIG. 4 is a diagram showing an example of contents held in the main memory (2002) in the network management server (20). The abnormal flow interruption management program (2011) is loaded in the main memory (2002), and executed by the CPU 2001. In addition, region management data (2021) and interruption setting management data (2022) necessary for executing the program are held in the main memory (2002).

The abnormal flow interruption management program (2011) will be described later with reference to FIG. 8, the region management data (2021) will be described later with reference to FIG. 5, and the interruption setting management data (2022) will be described later with reference to FIG. 6.

FIG. 5 is a diagram showing an example of a table for managing the regions according to the first embodiment. Region management data (2021) shown in FIG. 5 includes the respective fields of a region ID (501), a base station ID (502) of the base station (10) existing in a region (110) identified by an ID of the region ID (501), a communication node ID (503) of the communication node (11) connected to the base station (10), and an adjacent region ID (504) of another region (110) adjacent to the region (110).

In the example shown in FIG. 5, three regions including a region 1 (110-1) having the region ID (501) of "R1", a region 2 (110-2) having the region ID (501) of "R2", and a region 3 (110-3) having the region ID (501) of "R3" are managed in rows (511 to 513) of the table of the region management data (2021).

As indicated in the row (511), the base station 1 (10-1) and the base station 2 (10-2) whose base station IDs (502) are "B1" and "B2" are present in the region 1 (110-1), and the communication node 1 (11-1) and the communication node 2 (11-2) whose communication node IDs (503) are "N1" and "N2" are connected to the respective base stations. In addition, the adjacent region ID (504) indicates that the region 2 (110-2) whose region ID is "R2" is adjacent to the region 1 (110-1).

Likewise, as indicated in the row (512) and the row (513), data of the region ID (501), the base station IDs (502) of the base stations (10) present in the region 2 (110-2) and the region 3 (110-3), the communication node IDs (503) of the communication nodes (11) connected to the base stations (10), and the adjacent region IDs (504) of the respective regions (100) adjacent to the region 2 (110-2) and the region 3 (110-3) is stored for the region 2 (110-2) and the region 3 (110-3).

FIG. 6 is a diagram showing an example of a table for managing the interruption setting according to the first embodiment. The interruption setting management data (2022) shown in FIG. 6 includes the respective fields of an interruption flow ID (601) that is an identifier of the abnormal flow to be interrupted, a source (src) IP (internet protocol) address (602) and a destination (dest) IP address (603) of the abnormal flow to be interrupted, a connection state (604) of the mobile unit (50) transmitting the abnormal flow to be interrupted, a base station ID 605 of a base station (10) to be connected with the mobile unit (50), a communication node ID (606) of the communication node (11) connected to the base station (10), a belonging region ID (607) of the region (110) in which the mobile unit (50) is present, and an interruption setting communication node ID (608) which is an identifier of the communication node (11) in which the interruption of the abnormal flow is set.

Incidentally, in the interruption setting management data (2022), data of the connection state (604), the base station ID (605), the communication node ID (606), the belonging region ID (607), and the communication node ID (608) increases with the movement of the mobile unit (50), and the data shown in FIG. 6 is an example of the data in a state where the mobile unit (50) has moved to the area (100-3) of the base station 3 (10-3) shown in FIG. 1. In the connection state (604), numeric data such as "C" indicating that the mobile unit (50) is currently connected, "H" indicating the connection of the mobile unit (50) in the past is stored.

In the example shown in FIG. 6, the identifier of the abnormal flow to be interrupted is "F1", the source IP address of the abnormal flow is "s1", and the destination IP address is "d1". Also, as indicated in the row (611), in the current situation, the mobile unit (50) is connected to the communication node 3 (11-3) (the communication node ID is "N3") through the base station 3 (10-3) (base station ID is "B3"), and is present in the region 2 (110-2) (the region ID is "R2") under the management.

The interruption setting of the abnormal flow is implemented on the communication node 1 (11-1) (the communication node ID is "N1"), the communication node 2 (11-2) (the communication node ID is "N2"), the communication node 3 (11-3) (the communication node ID is "N3"), the communication node 4 (11-4) (the communication node ID is "N4"), the communication node 5 (11-5) (the communication node ID is "N5"), and communication node 6 (11-6) (the communication node ID is "N6").

Meanwhile, as indicated in the row (612), in the past, the mobile unit (50) is connected to the communication node 2 (the communication node ID is "N2") through the base station 2 (10-2) (the base station ID is "B2"), and the mobile unit (50) is present in the region 1 (110-1) (the region ID is "R1") under the management. Also, at that time, the interruption setting of the abnormal flow is implemented on the communication node 1 (11-1) (the communication node ID is "N1"), the communication node 2 (11-2) (the communication node ID is "N2"), the communication node 3 (11-3) (the communication node ID is "N3"), and the communication node 4 (11-4) (the communication node ID is "N4").

Likewise, as indicated in the row (613), in the past, the mobile unit (50) is connected to the communication node 1 (the communication node ID is "N1") through the base station 1 (10-1) (the base station ID is "B1"), and the mobile unit (50) is present in the region 1 (110-1) (the region ID is "R1") under the management. Also, at that time, the interruption setting of the abnormal flow is implemented on the communication node 1 (11-1) (the communication node ID is "N1"), the communication node 2 (11-2) (the communication node ID is "N2"), the communication node 3 (11-3) (the communication node ID is "N3"), and the communication node 4 (11-4) (the communication node ID is "N4").

FIG. 7 is a diagram showing a configuration example of the communication node (11). The communication node (11) includes network interfaces (704-1 to 704-n) (n is an integer of 1 or more), a switch (703), an abnormal flow interruption control unit (701), and a data transfer table (702). Also, as a physical configuration of the communication node (11), the abnormal flow interruption control unit (701) realizes defined processing in cooperation with another hardware with the execution of an abnormal flow interruption control program stored in the storage device not shown by a processor not shown.

The data transfer table (702) may also be stored in the storage device not shown. Each of the network interfaces (704-1 to 704-n) may be provided with a transmission buffer and a receiving buffer, or a transmission/reception buffer for the purpose of adjusting a timing of transmission and reception between the network and the switch (703).

The data transfer table (702) is a table for detecting whether a flow having the IP addresses indicated in the source IP address (602) and the destination IP address (603)

in FIG. 6 has been received, or not, and performing the interruption. Also, the data transfer table (702) is also a table for the switch (703) for transferring data from the received network interface (704) to the network interface (704) for transmission according to other destination IP addresses.

Upon receiving packet data (abnormal flow interruption information or abnormal flow cancellation information) addressed to its own communication node, the switch (703) transfers the packet data to the abnormal flow interruption control unit (701). The abnormal flow interruption control unit (701) sets an identifier (IP address) of an abnormal flow to be interrupted in the data transfer table (702) (starts monitoring) if the transferred packet data is abnormal flow interruption information, that is, an interruption notification.

When receiving the set abnormal flow, the switch (703) refers to the data transfer table (702), notifies the abnormal flow interruption control unit (701) of the reception of the set abnormal flow, and discards the data of the received abnormal flow. Upon detecting the reception (notification) of the abnormal flow, the abnormal flow interruption control unit (701) notifies the network management server (20) of the connection of the mobile unit (50) transmitting the abnormal flow.

Further, when the packet data transferred from the switch (703) is abnormal flow cancellation information, that is, an interruption cancellation notification, the abnormal flow interruption control unit (701) deletes (cancels monitoring) the identifier of the abnormal flow from the data transfer table (702).

If the abnormal flow interruption information is not notified, the communication node (11) does not set the identifier (IP address) of the abnormal flow to be interrupted in the data transfer table, thereby being capable of reducing the consumption of the storage device (memory) in which the data transfer table is stored. The same effects can be obtained by the deletion of the identifier of the abnormal flow due to the notification of the abnormal flow cancellation information. In addition, since the data of the abnormal flow is discarded, there is no need to allocate a buffer related to transmission. Further, since the abnormal flow does not flow to the network (30), the consumption of the network resources of the network (30) can also be reduced.

Various programs such as the abnormal flow interruption management program (2011) and the abnormal flow interruption control program may be installed in each computer by a program distribution server or a storage medium readable by a computer (server). In that case, the program distribution server includes a processor and a storage resource, and the storage resource further stores a distribution program and a program to be distributed. With the execution of the distribution program by the processor, the processor of the program distribution server distributes a distribution target program to other computers.

In addition, in the embodiments, functions equivalent to functions configured by software can be realized by hardware such as an FPGA (field programmable gate array), or an ASIC (application specific integrated circuit). Such a configuration is also included in the embodiments.

Figure 8:
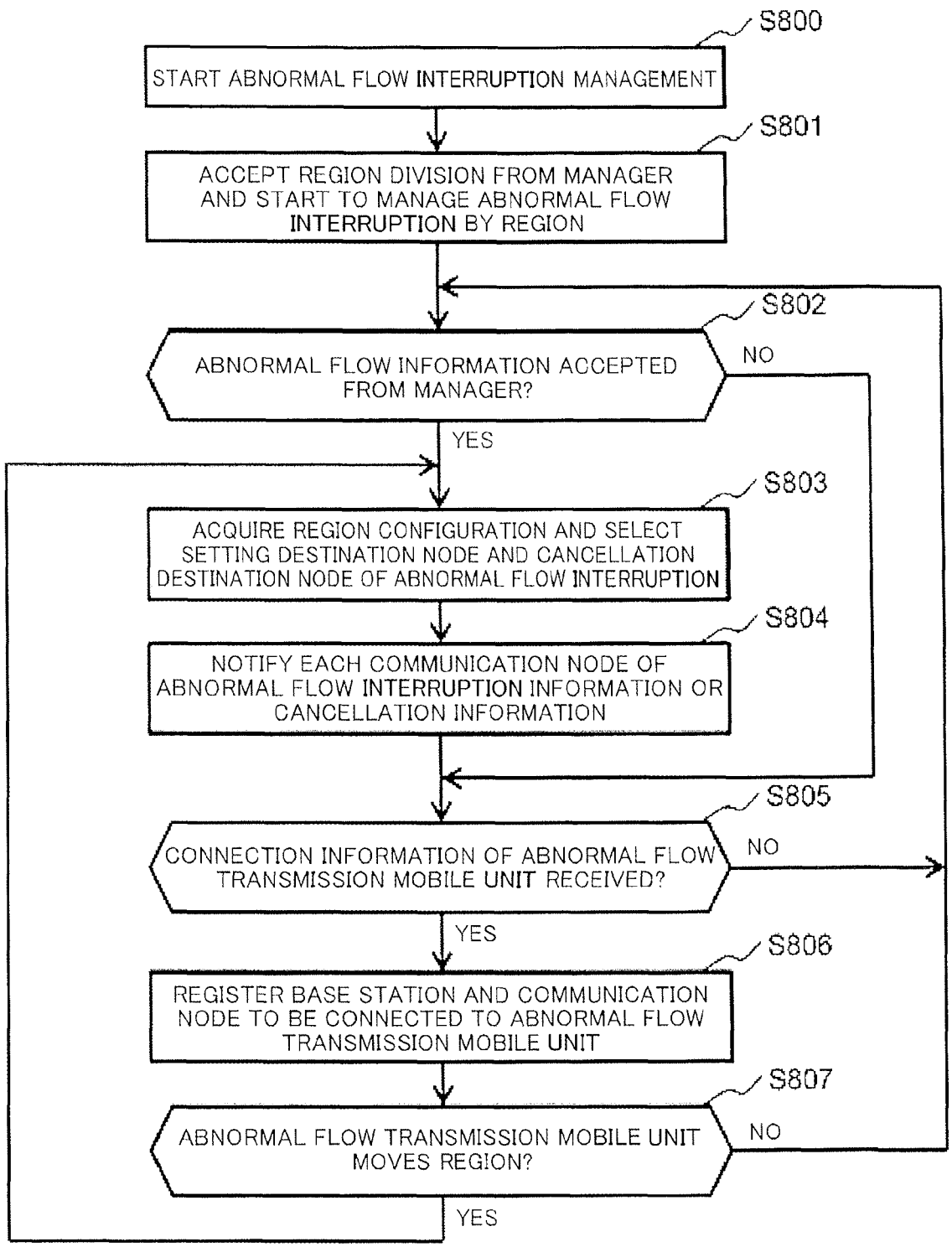
FIG. 8 shows an example of a flowchart of an abnormal flow interruption management.

FIG. 8 is a diagram showing an example of a flow chart of the abnormal flow interruption management. The network management server (20), that is, the CPU (2001) loads the abnormal flow interruption management program (2011) stored in the storage (2003) in the main memory (2002), and starts the interruption management of the abnormal flow (Step (S800)).

The network management server (20) accepts the distribution of the areas (100) into the regions (110) by an administrator of the network system, starts to execute and manage the control of the abnormal flow interruption on the region (110) basis (Step (S801)), and determines whether the abnormal flow information has been received by the administrator of the network system (Step (S802)).

In the determination of Step (S802), if it is determined that the abnormal flow information has been received, the network management server (20) acquires the configuration of the communication node (11) present in the region (110), selects the communication node (11) to be notified of the abnormal flow interruption information and/or the abnormal flow cancellation information (Step (S803)), notifies the selected communication node (11) of the abnormal flow interruption information and/or the abnormal flow cancellation information (Step (S804)), and proceeds to Step (S805).

In contrast, in the determination of Step (S802), if it is determined that the abnormal flow information has not been received, the network management server (20) proceeds to Step (S805).

The network management server (20) determines whether the connection information on the mobile unit (50) transmitting the abnormal flow has been received from the communication node (10), or not (Step (S805)). If it is determined that the connection information has not received, the process returns to the processing of Step (S802), and if it is determined that the connection information has been received, the network management server (20) registers the base station (10) and the communication node (11) which are connected with the mobile unit (50) transmitting the abnormal flow (Step (S806)).

Next, the network management server (20) determines whether the mobile unit (50) transmitting the abnormal flow has moved between the regions (110), or not (Step (S807)). If it is determined that the mobile unit (50) has moved, the process returns to the processing of Step (S803), and if it is determined that the mobile unit (50) has not moved, the process returns to the processing of Step (S802).

Incidentally, the abnormal flow information by the administrator of the network system includes the source IP address and the destination IP address of the abnormal flow and may include a flow ID. Also, the abnormal flow information may include information on the region (110) in which the mobile unit (50) is present, and Step (S803) to be executed next to Step (S802) may use that information. As a result, Step (S203) to Step (S204) shown in FIG. 2A can be performed.

Further, the abnormal flow information does not include the information of the region (110) in which the mobile unit (50) is present, and Step (S803) to be executed subsequent to Step (S802) may include the reception of the connection information on the mobile unit (50). The abnormal flow cancellation information may include the flow ID of the abnormal flow.

Figure 9:
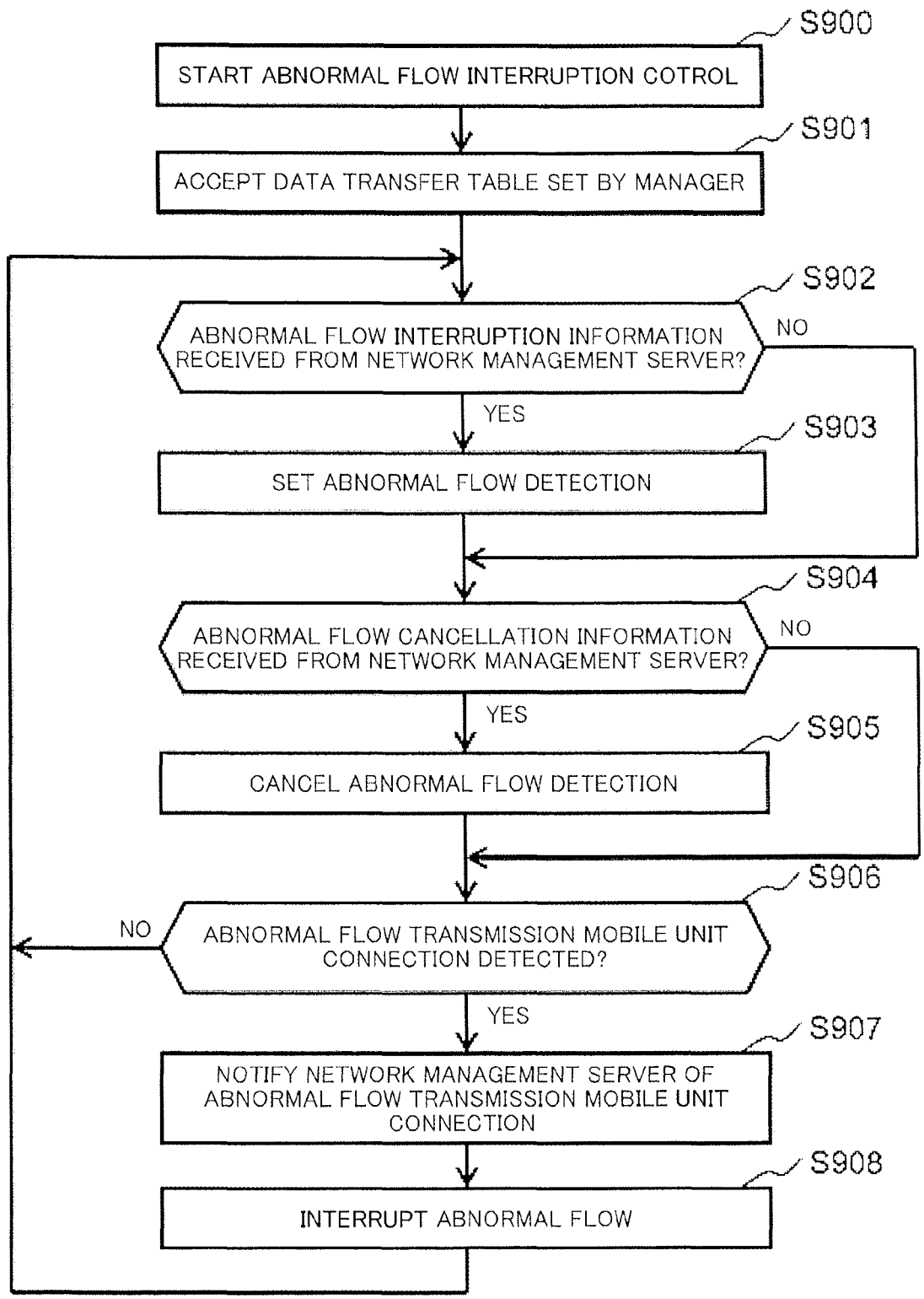
FIG. 9 shows an example of a flowchart showing an abnormal flow interruption control.

FIG. 9 is a diagram showing an example of a flowchart of the abnormal flow interruption control. The abnormal flow interruption control unit (701) in the communication node (11) starts the abnormal flow interruption control process with the execution of the abnormal flow interruption control program stored in the storage device not shown by a processor not shown (Step (S900)), and accepts the setting of the data transfer table (702) by the administrator of the communication node (11) (Step (S901)).

The abnormal flow interruption control unit (701) determines whether the abnormal flow interruption information has been received by the network management server (20), or not, (Step (S902)). If it is determined that the abnormal flow interruption information has been received, the abnormal flow interruption control unit (701) executes the setting of the abnormal flow detection (starts monitoring) according to the received abnormal flow interruption information (Step (S903)), and the abnormal flow interruption control unit (701) proceeds to Step (S904).

In the determination of Step (S902), if it is determined that the abnormal flow interruption information has not been received by the network management server (20), the abnormal flow interruption control unit (701) proceeds to the processing of Step (S904).

The abnormal flow interruption control unit (701) determines whether the abnormal flow cancellation information has been received by the network management server (20), or not (Step (S904)). When it is determined that the abnormal flow cancellation information has been received, the abnormal flow interruption control unit (701) cancels (cancels monitoring) the setting of the abnormal flow detection according to the received abnormal flow cancellation information (Step (S905)), and the abnormal flow interruption control unit (701) proceeds to the processing of Step (S906).

In the determination of Step (S904), if it is determined that the abnormal flow cancellation information has not been received from the network management server (20), the abnormal flow interruption control unit (701) proceeds to the processing of Step (S906).

The abnormal flow interruption control unit (701) determines whether the connection of the mobile unit (50) transmitting the abnormal flow has been detected, or not (Step (S906)). If it is determined that the connection has not been detected, the abnormal flow interruption control unit (701) proceeds to Step (S902).

In the determination of Step (S906), if it is determined that the connection of the mobile unit (50) transmitting the abnormal flow has been detected, the abnormal flow interruption control unit (701) notifies the network management server (20) of information indicating that the mobile unit (50) transmitting the abnormal flow has been connected (Step (S907)).

Upon notifying the network management server (20) of the information indicating that the mobile (50) transmitting the abnormal flow has been connected, the abnormal flow interruption control unit (701) executes the interruption of the data of the received abnormal flow (Step (S908)), and returns to the processing of Step (S902).

Incidentally, if the abnormal flow cancellation information determined whether to be received in Step (S904) includes the flow ID, or not, includes a flow ID, the cancellation of setting of the abnormal flow detection in Step (S905) may be executed based on the flow ID. The determination as to whether the connection of the mobile unit (50) transmitting the abnormal flow has been detected, or not, in Step (S906) may be performed based on the notification to the abnormal flow interruption control unit (701) from the switch (703). The interruption of the data of the abnormal flow in Step (S908) may be executed by discarding the packet data received by the switch (703).

As described above, the plurality of areas (100) are grouped into the regions (110), and the interruption of the abnormal flow is executed on the region (110) basis, to thereby prevent the frequent interruption setting process for the communication nodes (11), and enables the interruption of the abnormal flow without consuming the resources of a large number of communication nodes (11).

Second Embodiment

In a second embodiment, an example will be described in which a domain is specified in configuring a region. In the first embodiment, the plurality of areas (100) is grouped into the region (110). In contrast, in the second embodiment, a domain (range or boundary) of each region is designated, and base stations and communication nodes existing in the region are managed as an affiliation of that region. Hereinafter, the second embodiment will be described below with reference to FIGS. 10 to 12.

FIG. 10 is a diagram showing an example of a table for managing a domain of a region according to the second embodiment. Region domain management data shown in FIG. 10 includes the respective fields of a region ID (1001), a latitude range (1002), and a longitude range (1003). The latitude range (1002) includes a latitude 1 (1011) and a latitude 2 (1012), and the longitude range (1003) includes a longitude 1 (1013) and a longitude 2 (1014).

In the example shown in FIG. 10, three regions including a region 1 with the region ID (1001) of "R1", a region 2 with the region ID (1001) of "R2" and a region 3 with the region ID of "R 3" are managed by the row (1021 to 1023) of the table. As shown in the row (1021), the region 1 having the region ID of "R1" is configured by a domain designated (surrounded) by a latitude "n1" and a latitude "n2", and a longitude "e1" and a longitude "e2".

Likewise, as shown in the row (1022), the region 2 having the region ID of "R2" is configured by a domain designated by the latitude "n1" and the latitude "n2", and a longitude "e2" and a longitude "e3". As shown in the row (1023), the region 3 having the region ID of "R3" is configured by a domain designated by the latitude "n1" and the latitude "n2", and the longitude "e3" and a longitude "e4".

In the present embodiment, the domain of the region has been described as a two-dimensional area. However, the domain of the region may be set as another area, for example, a three-dimensional area. Region area management data shown in FIG. 10 may be set in advance by the administrator of the network system. In the setting, the administrator may set a length of the region domain in a latitude direction, a length of the region domain in a longitude direction, and a reference point for calculation of the domain of the region, and the table shown in FIG. 10 may be calculated by a computer.

FIG. 11 is a diagram showing an example of a table for managing the communication node connected to an installation position of the base station according to the second embodiment. The base station management data shown in FIG. 11 includes, for each base station, the respective fields of a base station ID (1101), a latitude (1102) and a longitude (1103) at which the base station is installed, and a connected communication node ID (1104).

In the example shown in FIG. 11, as indicated in a row (1111), the base station 1 having the base station ID of "B1" is installed at a latitude of "m1" and a longitude of "f1", and connected with the communication node 1 having the communication node ID of "N1" under the management. Likewise, as indicated in rows (1112 to 1117), the base station 2 to the base station 7 having the base station ID of "B2" to "B7" are installed at the latitude of "m1" and the longitudes of "f2" to "f7", respectively, and connected with the communication node 2 to the communication node 7 having the communication node ID of "N2" to "N7" under the management.

In FIGS. 10 and 11, the latitude has a relationship of "n1"<"m1"<"n2". In addition, the longitude has a relationship of "e1"<"f1"<"f2"<"e2"<"f3"<"f4"<"f5"<"e3"< "f6"<"f7"<"e4". The base station management data shown in FIG. 11 may be set in advance by the administrator of the network system. Since the base station and the communication node are physically installed and connected to each other, the base station management data may be acquired from the information obtained when the base station and the communication node are installed.

FIG. 12 is a diagram showing an example of a table for managing the base stations accommodated in the respective regions according to the second embodiment. The base station accommodation region management data shown in FIG. 12 includes the respective fields of a region ID (1201), a base station ID (1202) of the base station existing in the region, a communication node ID (1203) of the communication node connected to each base station, and a region ID (1204) of a region adjacent to that region.

In the example shown in FIG. 12, as indicated in a row (1211), the base station 1 having the base station ID of "B1" and the base station 2 having the base station ID of "B2" are present in the region 1 having the region ID of "R1" under the management. The communication node 1 having the communication node ID of "N1" is connected to the base station 1 having the base station ID of "B1", and the communication node 2 having the communication node ID of "N2" is connected to the base station 2 having the base station ID of "B2" under the management. In addition, the existence of the region 2 having the region ID of "R2" is managed as the adjacent region.

Likewise, as indicated in rows (1212 to 1213), the base station 3 to the base station 5 having the base station ID of "B3" to "B5", and the base station 6 and the base station 7 having the base station ID of "B6" and "B7" are present in the region 2 and the region 3 having the region ID of "R2" and "R3", respectively, under the management. The communication node 3 to the communication node 7 having the communication node ID of "N3" to "N7" are connected to the base station 3 to the base station 7 having the base station ID of "B3" to "B7", respectively, under the management.

In addition, the existence of the region 1 having the region ID of "R1" and the region 3 having the region ID of "R3" is managed as the adjacent regions of the region 2 having the region ID of "R2", and the existence of the region 2 having the region ID of "R2" is managed as the adjacent region of the region 3 having the region ID of "R3".

The base station accommodation region management data shown in FIG. 12 may be calculated by a computer based on a magnitude relationship of the latitude and the longitude according to the region domain management data shown in FIG. 10 and the base station management data shown in FIG. 11. For example, since a relationship of "n1"<"m1"<"n2" and a relationship of "e1"<"f1"<"f2"<"e2" are satisfied, the latitude and the longitude of the base station 1 fall within the latitude and longitude of the region 1, and the latitude and the longitude of the base station 2 also fall within the latitude and the longitude of the region 1. Therefore, it can be calculated that the base station 1 and the base station 2 are present in the region 1.

Since the region ID, the base station ID, the communication node ID, and the adjacent region ID can be associated with each other, as described in the first embodiment, the communication node can be set so that the abnormal flow is interrupted for each region, and can be set up to the adjacent region.

As described above, the region is configured by designated the domain, as a result of which even if the size of the area connectable to each base station is irregular, the correspondence with the region can be easily managed.

Third Embodiment

In a third embodiment, an example will be described in which a domain size of a region is controlled according to a speed of a mobile unit. The third embodiment will be described below with reference to FIGS. 13 to 16.

FIG. 13A is a diagram showing an example of a table for managing the speed of the mobile unit according to the third embodiment. Mobile unit speed management data shown in FIG. 13A includes the respective fields of a connection state (1301) in which data such as "C" indicating that each mobile unit is being currently connected, or "H" indicating that the mobile unit has been connected in the past is stored, a source IP address (1302) as the mobile unit, a base station ID (1303) of the connected base station, a connection start time (1304), and a moving speed (1305).

As shown in a row (1311), in the current situation, the mobile unit having the source IP address of "s1" starts to connect to the base station 2 having the base station ID of "B2" from a time of "Apr. 1, 2016, 13:04", and an inter-base-station moving speed is "V1 (48 km/h)" under the management.

Likewise, as indicated in a row (1312), at the past time, the mobile unit having the source IP address of "s1" starts to connect to the base station 1 having the base station ID of "B1" from a time of "Apr. 1, 2016, 13:00", and the inter-base-station moving speed cannot be calculated under the management.

FIG. 13B is a diagram showing an example of a table for managing the speed of the mobile unit relative to a moving speed different from that in FIG. 13A. As shown in FIG. 13B, mobile unit speed management data includes the same fields as those shown in FIG. 13A for each mobile unit, but data is different between FIGS. 13A and 13B. The mobile unit speed management data shown in FIG. 13A and the mobile unit speed management data shown in FIG. 13B may be different data of one table or respective data of another table.

As shown in a row (1321), in the current situation, the mobile unit having the source IP address of "s2" starts to connect to the base station 3 having the base station ID of "B3" from a time of "Oct. 1, 2016, 16:02", and the inter-base-station moving speed is "V2 (96 km/h)" under the management.

Likewise, as shown in a row (1322), at the past time, the mobile unit having the source IP address of "s2" starts to connect to the base station 2 having the base station ID of "B2" from a time of "Oct. 1, 2016, 16:00", and the inter-base-station moving speed cannot be calculated" under the management.

The mobile unit speed management data shown in FIG. 13A and FIG. 13B may be detected by the base station and stored in the main memory of the network management server.

FIG. 14 is a diagram showing an example of a table for managing a range of a region according to the third embodiment. As shown in FIG. 14, the region domain management data includes the respective fields of a region domain management number (1401), a speed range of the mobile unit in the region (1402), and the number of regions (1403) for a domain R (the domain R is a preset area, for example, area: 38.4 Km×38.4 Km).

As shown in a line (1411), when the region domain management number is "1", if the speed of the mobile unit is less than 80 km/h, the domain R is divided into 16 regions under the management. In contrast, as shown in a row (1412), when the region domain management number is "2", if the speed of the mobile unit is 80 km/h or more, the domain R is divided into nine regions under the management.

In the present embodiment, the domain of each region is defined based on the number of regions for each domain R. However, the domain of each region may be defined with the use of coordinate axes according to the speed of the mobile unit. The region domain management data shown in FIG. 14 may be set in the main memory of the network management server by the administrator of the network system.

FIG. 15A is a diagram showing an example of segmentation management of a region when the speed of the mobile unit is less than 80 km/h according to the third embodiment. As shown in FIG. 15A, when the speed of the mobile unit is less than 80 km/h, a domain R (1501) of the area: 38.4 Km×38.4 Km is divided into 16 regions (1510-1 to 1510-16) under the management. For that reason, each region (1510) has the domain of an area: 9.6 Km×9.6 Km.

FIG. 15B is a diagram showing an example of segmentation management of regions when the speed of the mobile unit is 80 km/h or more according to the third embodiment. As shown in FIG. 15B, when the speed of the mobile unit is 80 km/h or more, the domain R (1501) of the area: 38.4 Km×38.4 Km is divided into nine regions (1520-1 to 1520-9) under the management. For that reason, each region (1520) has the domain of the area: 12.8 Km×12.8 Km.

Figure 16:
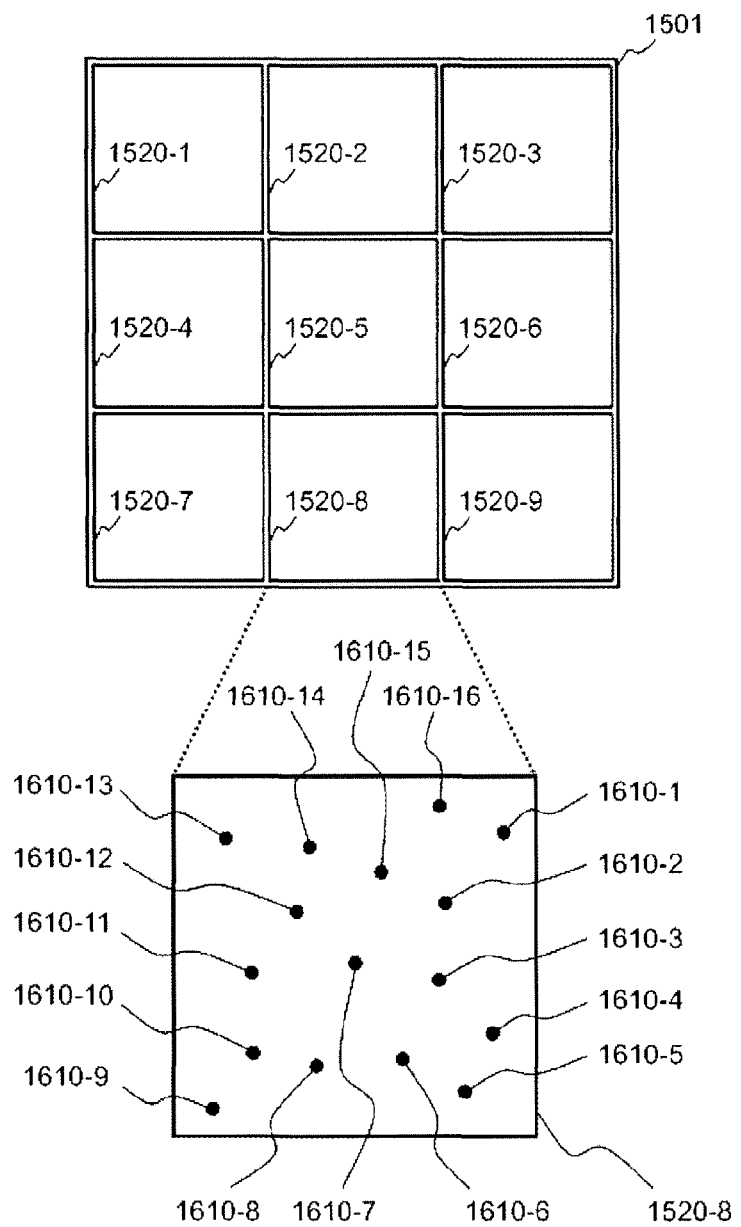
FIG. 16 shows an example of a relationship between regions and base stations according to the third embodiment.

FIG. 16 is a diagram showing an example of a relationship between a region (1520) and a base station (1610) according to a third embodiment. In particular, FIG. 16 shows a relationship of the base station (1610) existing in the region (1520-8). As shown in FIG. 16, there are 16 base stations (1610-1 to 1610-16) in the region (1520-8), and those base stations are managed. More specifically, the base station belonging to the region (1620-8) is managed according to a positional relationship between positions at which the respective base stations (1610) exist and the region of the region (1620-8).

Similarly, in the regions (1620-1 to 1620-7, 1620-9), a relationship of the base stations in the region (1620) is managed. In this manner, the region is configured by designating the domain, thereby being capable of easily managing an association of the respective base stations with the region even if the sizes of areas that can be connected to each base station are irregular, which is effective particularly when the domain of the region is dynamically changed.

For example, if the speed of the mobile unit moving from an area of the base station (1610-12) to an area of the base station (1610-13) in the region (1520-8) shown in FIG. 16 (FIG. 15B) is 60 km/h, since the speed is less than 80 Km/h, the region domain management number is 1 and the number of regions is 16. Therefore, the segmentation of the regions shown in FIG. 15B is changed to the segmentation of the regions shown in FIG. 15A.

In addition, if the speed of the mobile unit in the region shown in FIG. 15A is 80 km/h or more, conversely, the segmentation of the region shown in FIG. 15A is changed to the segmentation of the region shown in FIG. 15B. As described in the first embodiment, the communication node is set so as to interrupt the abnormal flow up to the adjacent region, thereby being capable of interrupting the abnormal flow in a wide range under the control when the speed of the mobile unit is high, and interrupting the abnormal flow in a narrow range under the control when the speed of the mobile unit is low.

In this example, when there are a plurality of mobile units in the regions (1510, 1520), the maximum speed of the plurality of mobile units may be used for determining a change in the segmentation of the region. Alternatively, not the maximum speed, but an average value or a median value of the moving speeds of the mobile units present within the regions (1510, 1520) may be used.

As described above, with a change in the domain of each region according to the speed of the mobile unit, even when the mobile unit that is high in the moving speed moves between the base stations, frequent interruption setting processing of the communication node is prevented, and the abnormal flow can be interrupted without consuming a large number of communication node resources.

Fourth Embodiment

In a fourth embodiment, an example of configuring a region based on a reference area will be described. Hereinafter, the fourth embodiment will be described with reference to FIGS. 17 and 18.

Figure 17:
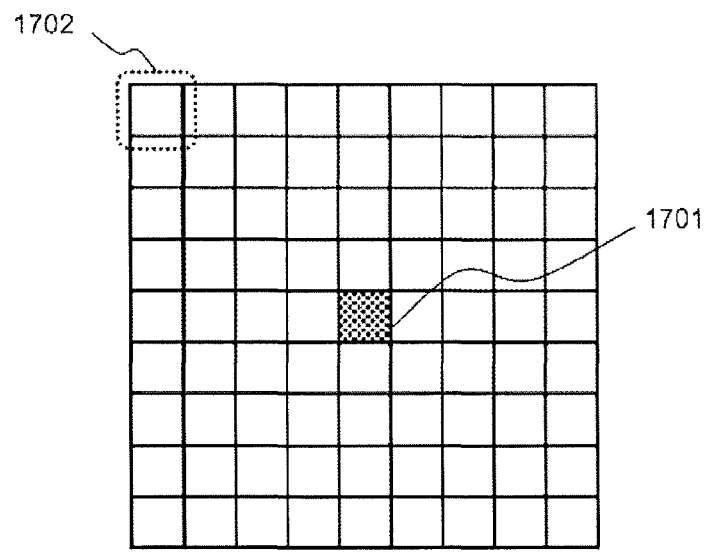
FIG. 17 shows an example of an area configuration that is assigned to each base station according to a fourth embodiment.

FIG. 17 is a diagram showing an example of an area configuration assigned to each base station and an area selection as a reference according to the fourth embodiment. In FIG. 17, a solid square surrounded by a dotted line (1702) is one square, and each of 81 (9×9) squares represents an area connectable to each base station. Each area is managed as an array, to thereby manage which area belongs to which region. It is preferable that one communication node corresponds to one area.

A reference area (1701) is set as an initial stage for configuring the regions according to the fourth embodiment. In the example of FIG. 17, a center of 81 squares is set as a reference area (1701), and hatched for the purpose of facilitating understanding on the drawing.

Figure 18:
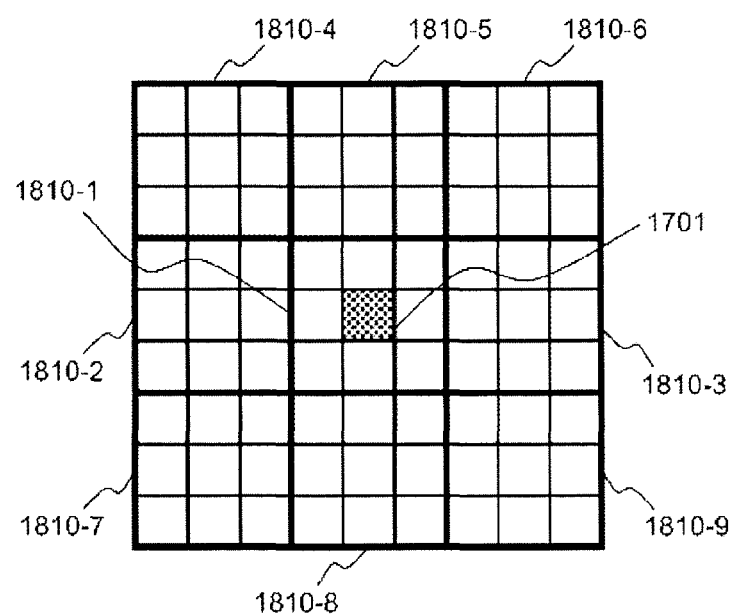
FIG. 18 shows an example of the configuration of the regions according to the fourth embodiment.

FIG. 18 is a diagram showing a configuration example of the region according to the fourth embodiment. In FIG. 18, the reference area (1701) and a plurality of areas surrounding the reference area (1701) are grouped as a region (1810-1). In this example, the region (1810-1) is an area defined by a heavy line frame that groups nine areas.

The region (1810-1) is used as a reference, and the same domain (area and shape) as the region (1810-1) is extended as an array on the right side and the left side of the region (1810-1) in FIG. 18, to thereby configure a region (1810-2) and a region (1810-3), respectively.

Relative to the regions (1810-1 to 1810-3), the region is extended as an array on the upper side and the lower side of the regions (1810-1 to 1810-3) in FIG. 18, to thereby configure regions (1810-4 to 1810-6) and regions (1810-7 to 1810-9), respectively.

In this way, the region is configured by the reference area and the configured region is extended as the array to form a plurality of regions.

In FIG. 18, the terms of up, down, right, and left are expressed. However, geographically, an east-west length of the reference area or a north-south length is set as r, and a domain extended from an outer circumference of the reference area by r in the north, south, east and west directions may be set. Further, in FIGS. 17 and 18, examples in which the size of each area is the same as each other as a square are shown, but when the size of each area is different from each other, an area having the maximum size is selected as the selection of the reference area. As a result, the size of the region is defined to be large and set to accommodate a plurality of areas.

In contrast, when an area having a small size is selected as the reference area to form the region, since the domain of the region is also set to be small, if there is an area having a large size, there is a possibility that only one area exists in one region. A frequent interruption setting control is required for the area if the moving speed of the mobile unit is high. In order to avoid the frequent interruption setting control, the area having the large size is selected as the reference area.

Since a relationship between the area (communication node) and the region is determined, as described in the first embodiment, the communication node can be set so as to interrupt the abnormal flow for each region, and can be set up to the adjacent region.

As described above, when the areas are arranged in a square shape, the regions can be easily set.

Fifth Embodiment

In a fifth embodiment, an example will be described in which the number of areas configuring a region is controlled according to a speed of a mobile unit. The fourth embodiment will be described below with reference to FIG. 19.

Figure 19A:
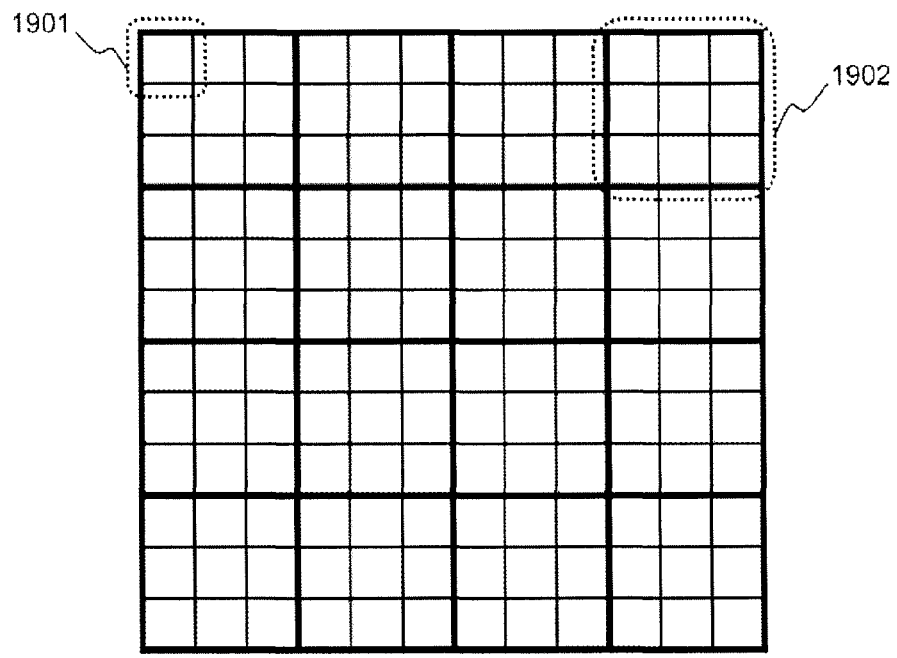
FIG. 19A shows an example of a region segmentation management according to a mobile unit speed in the fourth embodiment.

FIG. 19A is a diagram showing an example of a region according to a speed of a mobile unit according to a fifth embodiment. In FIG. 19A, a solid square surrounded by a dotted line (1901) is one square, and each of 144 (12×12) squares represents an area connectable to each base station. It is preferable that one communication node corresponds to one area.

For example, when the speed of the mobile unit is less than 80 Km/h, the nine areas are grouped into one region. As shown in FIG. 19A, a thick line frame surrounded by a dotted line (1902) is one region, and includes nine areas. A plurality of regions is also managed as squares. In this example, the regions are configured so that the mobile unit is required to pass through three or more areas for movement between non-adjacent zones.

Figure 19B:
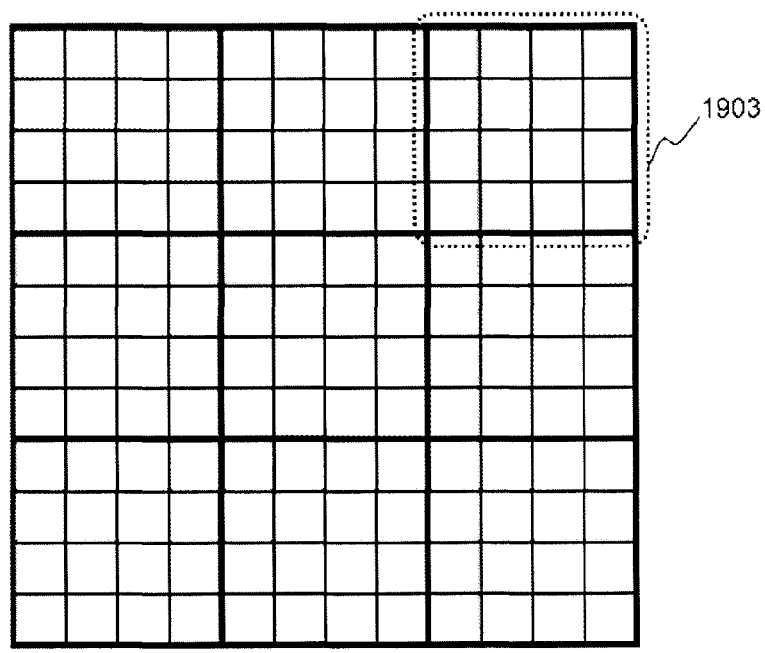
FIG. 19B shows an example of the region segmentation management according to the mobile unit speed in the fourth embodiment.

FIG. 19B is a diagram showing an example of a region corresponding to a moving speed different from that in FIG. 19A according to the fifth embodiment. In FIG. 19B, the communication nodes, the base stations, and the areas are the same as those in FIG. 19A, and each of 144 squares represents an area connectable to each base station. For example, when the speed of the mobile unit is 80 km/h or more, 16 areas are grouped into one region.

As shown in FIG. 19B, a thick line frame surrounded by a dotted line (1903) is one region and includes 16 areas. The plurality of regions are also managed so as to be squares. In this example, the regions are configured so that the mobile unit is required to pass through four or more areas for movement between non-adjacent zones.

Since a relationship between the area (communication node) and the region is determined, as described in the third embodiment, the communication node can be set so as to interrupt the abnormal flow for each region, and can be set up to the adjacent region.

In FIGS. 19A and 19B, the number of areas configuring the region is changed with reference to the speed of 80 km/h, but other speeds may be used as the reference. In addition, a plurality of reference speeds are set as the reference speed so that processing for configuring a region from a plurality of areas may be performed in a plurality of stages. Further, the region may be configured by components other than the number of areas in the present embodiment.

As described above, with a change in the domain of each region according to the speed of the mobile unit, even when the mobile unit that is high in the moving speed moves between the base stations, frequent interruption setting processing of the communication node is prevented, and the abnormal flow can be interrupted without consuming a large number of communication node resources.

Although the present disclosure has been described with reference to example embodiments, those skilled in the art will recognize that various changes and modifications may be made in form and detail without departing from the spirit and scope of the claimed subject matter.

What is claimed is:

1. A wireless communication system that improves security and utilization of a network, the wireless communication system comprising:
   a plurality of communication nodes, wherein at least one of the plurality of communication nodes is communicatively coupled to a mobile unit;
   a plurality of base stations that are each communicatively coupled to a respective communication node from the plurality of communication nodes, wherein each of the plurality of base stations is associated with a geographic location and has an associated range; and
   a network management server that is communicatively coupled to the plurality of communication nodes via the network,
   wherein the network management server is configured to:
      assign each of the plurality communication nodes to one or more of a plurality of regions,
      manage the plurality of communication nodes in association with each other based on the respective geographic location and range of the plurality of base stations,
      detect an abnormal flow of communication from the mobile unit in a first region from the plurality of regions,
      determine a size of a second region of the plurality of regions based on a detected speed of the mobile unit, and
      in response to detecting the abnormal flow, notify one or more communication nodes that are assigned to the second region to restrict communication with the mobile unit,
   wherein the management server determines the size of the second region by:
      comparing the detected speed of the mobile unit to a high speed range and a low speed range,
      on a condition that the detected speed is included in the high speed range, widening the size of the second region, and
      on a condition that the detected speed is included in the low speed range, narrowing the size of the second region.

2. The wireless communication system according to claim 1, wherein
   the one or more communication nodes that are assigned to the second region restrict communication with the mobile unit by interrupting the communication with the mobile unit.

3. A wireless communication management method that improves security and utilization of a network, the wireless communication management method comprising:
   assigning, by a management server, each of a plurality of communication nodes to one or more of a plurality of regions, wherein the plurality of communication nodes are communicatively coupled to the management server via the network;
   managing, by the management server, the plurality of communication nodes in association with each other based on a respective geographic location and range of a plurality of base stations, wherein plurality of base stations that are each communicatively coupled to a respective communication node from the plurality of communication nodes and each of the plurality of base stations is associated with a geographic location and has an associated range;

detecting, by the management server, an abnormal flow on communication from a mobile unit in a first region from the plurality of regions, wherein the mobile unit is communicatively coupled the network via one or more of the plurality of communication nodes;

determining, by the management server, a size of a second region of the plurality of regions based on a detected speed of the mobile unit, and notifying, by the management server, one or more communication nodes that are assigned to the second region to restrict communication with the mobile unit in response to the detecting of the abnormal flow, wherein the determining the size of the second region is performed by the management server:
- comparing the detected speed of the mobile unit to a high speed range and a low speed range,
- on a condition that the detected speed is included in the high speed range, widening the size of the second region, and
- on a condition that the detected speed is included in the low speed range, narrowing the size of the second region.

4. A network management apparatus that improves security and utilization of a network, the network management apparatus comprising:

a communication interface that is communicatively coupled to a plurality of communication nodes over the network;

a memory;

a processor that is communicatively coupled to the communication interface and the memory, wherein the processor is configured to:

assign, using the communication interface, each of the plurality communication nodes to one or more of a plurality of regions, manage, using the communication interface, the plurality of communication nodes in association with each other based on a respective geographic location and range of a plurality of base stations, wherein plurality of base stations that are each communicatively coupled to a respective communication node from the plurality of communication nodes and each of the plurality of base stations is associated with a geographic location and has an associated range;

detect, using the communication interface, an abnormal flow of communication from a mobile unit in a first region from the plurality of regions, wherein the mobile unit communicates with the network via one or more of the plurality of communication nodes, determine a size of a second region of the plurality of regions based on a detected speed of the mobile unit, and notify, using the communication interface, one or more communication nodes that are assigned to the second region to restrict communication with the mobile unit in response to detecting the abnormal flow, wherein the size of the second region is determined by the processor:
- comparing the detected speed of the mobile unit to a high speed range and a low speed range,
- on a condition that the detected speed is included in the high speed range, widening the size of the second region, and
- on a condition that the detected speed is included in the low speed range, narrowing the size of the second region.

* * * * *